US010388923B2

(12) United States Patent
Takahashi et al.

(10) Patent No.: US 10,388,923 B2
(45) Date of Patent: Aug. 20, 2019

(54) VEHICLE BATTERY UNIT

(75) Inventors: Koichi Takahashi, Wako (JP); Eiji Koike, Wako (JP); Daisuke Arai, Wako (JP); Takurou Kamada, Wako (JP); Kentaro Shibuya, Wako (JP); Harumi Takedomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 13/882,822

(22) PCT Filed: Oct. 13, 2011

(86) PCT No.: PCT/JP2011/073524
§ 371 (c)(1),
(2), (4) Date: Jun. 17, 2013

(87) PCT Pub. No.: WO2012/066875
PCT Pub. Date: May 24, 2012

(65) Prior Publication Data
US 2013/0330587 A1 Dec. 12, 2013

(30) Foreign Application Priority Data

Nov. 17, 2010 (JP) .................................. 2010-256635

(51) Int. Cl.
*H01M 2/10* (2006.01)
*B60K 1/04* (2019.01)
(Continued)

(52) U.S. Cl.
CPC ............. *H01M 2/1077* (2013.01); *B60K 1/04* (2013.01); *H01M 10/625* (2015.04);
(Continued)

(58) Field of Classification Search
CPC ............. H01M 2/1077; H01M 10/425; H01M 10/482; H01M 2/1016; H01M 10/625;
(Continued)

(56) References Cited

U.S. PATENT DOCUMENTS 6,622,809 B2 * 9/2003 Takahashi ................ B60K 1/04
180/68.5
2002/0185941 A1 * 12/2002 Ferraro .............. A47B 87/0253
312/107
(Continued)

FOREIGN PATENT DOCUMENTS

CN 1855596 A 11/2006
CN 101136457 A 3/2008
(Continued)

OTHER PUBLICATIONS

Nakamura, Machine translation of JP 2009-266563-A, Nov. 12, 2009, obtained from Espacenet.com (Year: 2009).*
(Continued)

*Primary Examiner* — Milton I Cano
*Assistant Examiner* — Jennifer A Moss
(74) *Attorney, Agent, or Firm* — Westerman, Hattori, Daniels & Adrian, LLP

(57) ABSTRACT

In a vehicle battery unit, since a second support plate (30B) and a second end plate (29B) of a second battery module (22B) having a plurality of battery cells (21) stacked are placed on top of a first support plate (30A) and a first end plate (29A) of a first battery module (22A) having a plurality of the battery cells (21), it is possible to prevent the weight of the second battery module (22B) from being imposed on the battery cells (21) of the first battery module (22A). Moreover, since it is not necessary to provide on the exterior of the first battery module (22A) a member for supporting
(Continued)

the weight of the second battery module (22B), it is possible to reduce the dimensions of the first battery module (22A).

8 Claims, 11 Drawing Sheets

(51) Int. Cl.
 *H01M 10/625* (2014.01)
 *H01M 10/663* (2014.01)
 *B60K 1/00* (2006.01)
(52) U.S. Cl.
 CPC ..... *H01M 10/663* (2015.04); *B60K 2001/005* (2013.01); *B60K 2001/0416* (2013.01)
(58) Field of Classification Search
 CPC ......... H01M 10/663; B60K 2001/0416; B60K 2001/005; B60K 1/04; E04B 1/19; E04B 1/02; E04B 1/1993
 See application file for complete search history.

(56) References Cited

U.S. PATENT DOCUMENTS

| | | | | |
|---|---|---|---|---|
| 2006/0204840 | A1* | 9/2006 | Jeon et al. | 429/152 |
| 2006/0250052 | A1* | 11/2006 | Davis | A47B 47/042 312/107 |
| 2007/0141459 | A1* | 6/2007 | Goto | H01M 2/1077 429/159 |
| 2007/0190409 | A1* | 8/2007 | Sakurai | H01G 2/04 429/159 |
| 2008/0050645 | A1* | 2/2008 | Kai | B60L 11/1861 429/61 |
| 2010/0000816 | A1* | 1/2010 | Okada | H01M 2/1077 180/68.5 |
| 2010/0187027 | A1* | 7/2010 | Komaki | H01M 2/1077 180/65.21 |
| 2011/0104543 | A1* | 5/2011 | Kim et al. | 429/99 |
| 2011/0104548 | A1* | 5/2011 | Saito | H01M 2/1072 429/120 |
| 2011/0117419 | A1* | 5/2011 | Lee et al. | 429/156 |
| 2011/0151311 | A1* | 6/2011 | Lee | H01M 2/1077 429/156 |

FOREIGN PATENT DOCUMENTS

| | | |
|---|---|---|
| CN | 101395737 A | 3/2009 |
| CN | 101517780 A | 8/2009 |
| EP | 0405803 A2 | 1/1991 |
| JP | 06-089706 A | 3/1994 |
| JP | 2001-110379 A | 4/2001 |
| JP | 2005-050616 A | 2/2005 |
| JP | 2008-269985 A | 11/2008 |
| JP | 2009-026601 A | 2/2009 |
| JP | 2009-087758 A | 4/2009 |
| JP | 2009-099445 A | 5/2009 |
| JP | 2009266563 A * | 11/2009 |
| JP | 2009-301969 A | 12/2009 |
| JP | 2011-108653 A | 6/2011 |
| JP | 2011-159474 A | 8/2011 |
| WO | 2010/123091 A1 | 10/2010 |

OTHER PUBLICATIONS

International Search Report of PCT/JP2011/073524, dated Jan. 10, 2012.

Office Action dated Nov. 4, 2014, issued in corresponding Chinese Patent Application No. 201180053440.8 (5 pages).

Japanese Office Action dated Aug. 27, 2014, issued in corresponding Japanese Patent Application No. 2012-544154 (2 pages).

Decision of Granting a Patent dated Mar. 25, 2015, issued in corresponding Japanee Patent Application No. 2012-544154 (3 pages).

\* cited by examiner

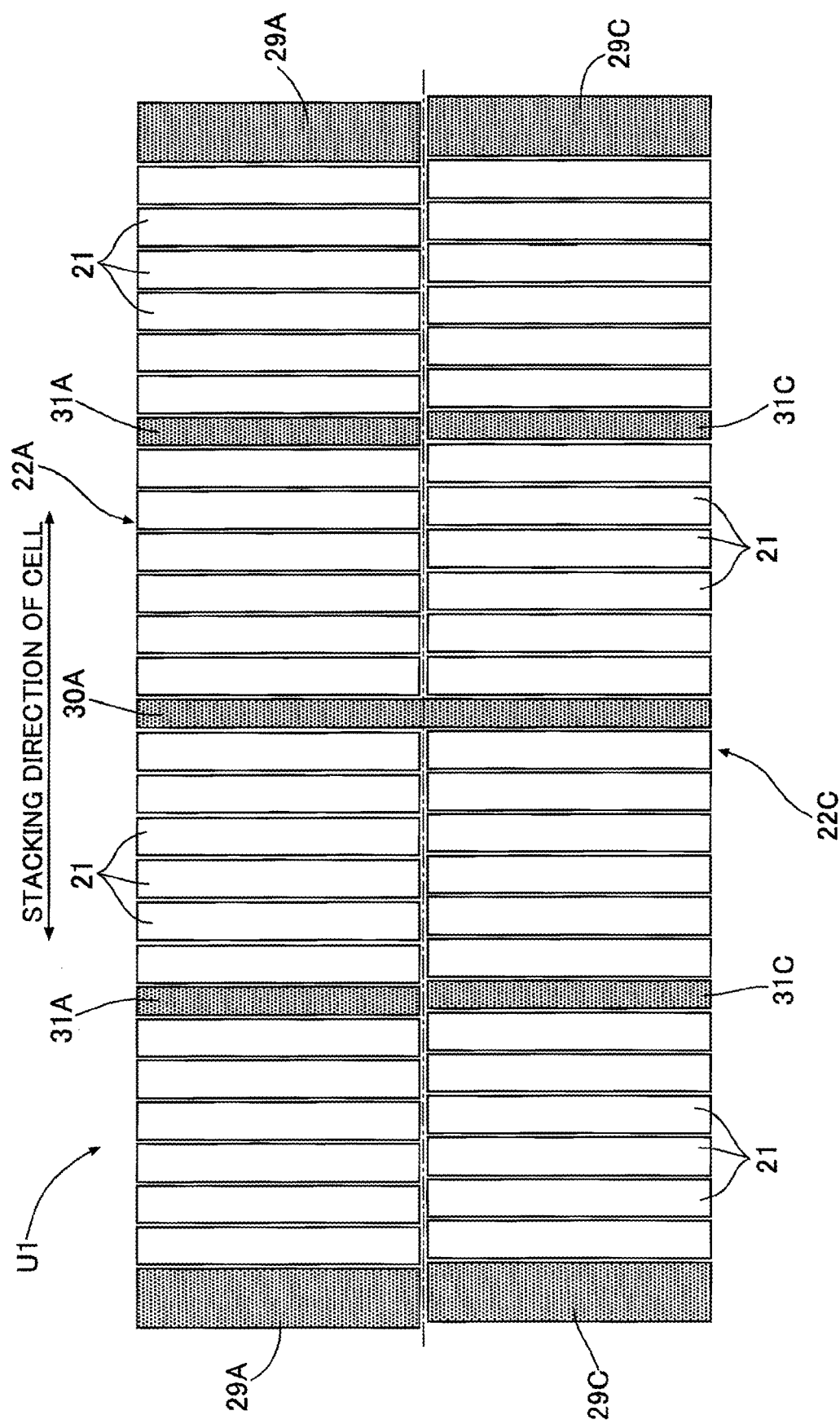

VEHICLE BATTERY UNIT

TECHNICAL FIELD

The present invention relates to a vehicle battery unit that includes first and second battery modules having a plurality of battery cells stacked in a horizontal direction, the second battery module being superimposed on top of the first battery module.

BACKGROUND ART

An arrangement in which, when battery modules in which a plurality of battery cells are housed in the interior of a rectangular parallelepiped-shaped exterior case are superimposed vertically in two tiers, in order to prevent the exterior case of the lower tier battery module from being crushed by the weight of the upper tier battery module, a plurality of column-shaped strengthening members (spacers) are provided on a side face of the exterior case of the lower tier battery module is known from Patent Document 1 below.

RELATED ART DOCUMENTS

Patent Document

Patent Document 1: Japanese Patent Application Laid-open No. 2009-26601

SUMMARY OF THE INVENTION

Problems to be Solved by the Invention

Since the invention described in Patent Document 1 above requires a plurality of column-shaped strengthening members to be provided on a side face of the exterior case of the lower tier battery module in order to enhance the strength of the lower battery module, the dimensions of the exterior case of the lower tier battery module are larger than the dimensions of the exterior case of the upper tier battery module, and not only does this hinder installation of the battery module in a vehicle body, but there is also a possibility that, when a passage for cooling air is formed on the side face of the exterior case, the flow of cooling air will be impeded by the column-shaped strengthening member.

The present invention has been accomplished in light of the above-mentioned circumstances, and it is an object thereof to avoid by means of a compact structure the weight of a second battery module being imposed on battery cells of a first battery module when the second battery module is superimposed on top of the first battery module.

Means for Solving the Problems

In order to attain the above object, according to a first aspect of the present invention, there is provided a vehicle battery unit comprising first and second battery modules having a plurality of battery cells stacked in a horizontal direction, the second battery module being superimposed on top of the first battery module, characterized in that the first battery module comprises a first support plate disposed in an intermediate part in a stacking direction of the plurality of battery cells and first end plates disposed in each of opposite end parts in the stacking direction of the plurality of battery cells, and the second battery module comprises a second support plate disposed in an intermediate part in the stacking direction of the plurality of battery cells and second end plates disposed in each of opposite end parts in the stacking direction of the plurality of battery cells, the second support plate being placed on top of the first support plate, and the second end plates being placed on top of the first end plates.

Further, according to a second aspect of the present invention, in addition to the first aspect, a heat insulating member is disposed between the first support plate and the battery cell adjacent thereto or between the first end plate and the battery cell adjacent thereto.

Furthermore, according to a third aspect of the present invention, in addition to the first aspect, a heat insulating member is disposed between the second support plate and the battery cell adjacent thereto or between the second end plate and the battery cell adjacent thereto.

Moreover, according to a fourth aspect of the present invention, in addition to the first aspect, a third battery module having a plurality of battery cells stacked in the horizontal direction is placed side by side with respect to the first battery module in a direction perpendicular to the stacking direction, the third battery module comprises a third support plate disposed in an intermediate part in the stacking direction of the plurality of battery cells and third end plates disposed in each of opposite end parts in the stacking direction of the plurality of battery cells, the third support plate is formed integrally with the first support plate, the third end plates are formed separately from the first end plates, and the first and third support plates are fixed to a lower plate on which the first and third battery modules are placed.

Further, according to a fifth aspect of the present invention, in addition to the fourth aspect, a positioning flange extending along the stacking direction between the first and third battery modules is formed on the lower plate, a holder is disposed between the plurality of battery cells, the holder positioning the plurality of battery cells relative to each other, and an engagement portion engaging with the positioning flange is formed on the holder.

First and second center plates 30A and 30B of an embodiment correspond to the first to third support plates of the present invention, a holder 46 of the embodiment corresponds to the heat insulating member of the present invention, and an engagement groove 46e of the embodiment corresponds to the engagement portion of the present invention.

Effects of the Invention

In accordance with the first aspect of the present invention, the first battery module having the plurality of battery cells stacked in the horizontal direction includes the first support plate disposed in the intermediate part in the stacking direction of the plurality of battery cells and the first end plates disposed in opposite end parts in the stacking direction, and the second battery module having the plurality of battery cells stacked in the horizontal direction includes the second support plate disposed in the intermediate part in the stacking direction of the plurality of battery cells and the second end plates disposed in opposite end parts in the stacking direction. Since the second support plate is placed on top of the first support plate and the second end plates are placed on top of the first end plates, it is possible to prevent the weight of the second battery module from being imposed on the battery cells of the first battery module. Moreover, since it is not necessary to provide on the exterior of the first battery module a member for supporting the weight of the second battery module, it is possible to reduce the dimensions of the first battery module.

Furthermore, in accordance with the second aspect of the present invention, since the heat insulating member is disposed between the first support plate and its adjacent battery cell or between the first end plate and its adjacent battery cell, it is possible to prevent the battery cell from being excessively cooled due to being deprived of heat by means of the first support plate or the first end plate.

Moreover, in accordance with the third aspect of the present invention, since the heat insulating member is disposed between the second support plate and its adjacent battery cell or between the second end plate and its adjacent battery cell, it is possible to prevent the battery cell from being excessively cooled due to being deprived of heat by means of the second support plate or the second end plate.

Furthermore, in accordance with the fourth aspect of the present invention, the third battery module having a plurality of battery cells stacked in the horizontal direction is placed side by side relative to the first battery module in a direction perpendicular to the stacking direction of the battery cells. Since the third battery module includes the third support plate disposed in the intermediate part in the stacking direction of the plurality of battery cells and the third end plates disposed in opposite end parts in the stacking direction, the third support plate is formed integrally with the first support plate, the third end plates are formed separately from the first end plates, and the first and third support plates are fixed to the lower plate on which the first and third battery modules are placed, not only is it possible to minimize displacement of the first and third battery modules in the stacking direction on the lower plate even when there are variations in the thickness of the plurality of battery cells of the first and third battery modules, but it is also possible to prevent a gap from being formed between adjacent battery cells by staggering the positions of the first and third end plates, which are separate members, in the stacking direction.

Moreover, in accordance with the fifth aspect of the present invention, since the holder positioning the plurality of battery cells relative to each other is disposed therebetween, not only is it possible to prevent the plurality of battery cells from being displaced, but since the positioning flange extending along the stacking direction of the battery cells between the first and third battery modules is formed on the lower plate, and the engagement portion engaging the positioning flange is formed on the holder, it is also possible to reliably carry out positioning so that the battery cells do not move in a direction perpendicular to the stacking direction while allowing the battery cells to move in the stacking direction and taking up tolerances in the thickness of the battery cells.

BRIEF DESCRIPTION OF DRAWINGS

FIG. 11 is a diagram for explaining how tolerances in the dimensions of the battery cells are taken up. (first embodiment)

EXPLANATION OF REFERENCE NUMERALS AND SYMBOLS

21 Battery cell
22A First battery module
22B Second battery module
22C Third battery module
25 Lower plate
25c Positioning flange
29A First end plate
29B Second end plate
29C Third end plate
30A First center plate (first support plate, third support plate)
30B Second center plate (second support plate)
46 Holder (heat insulating member)
46e Engagement groove (engagement portion)

MODES FOR CARRYING OUT THE INVENTION

A mode for carrying out the present invention is explained below by reference to FIG. 1 to FIG. 11.

First Embodiment

Figure 1:
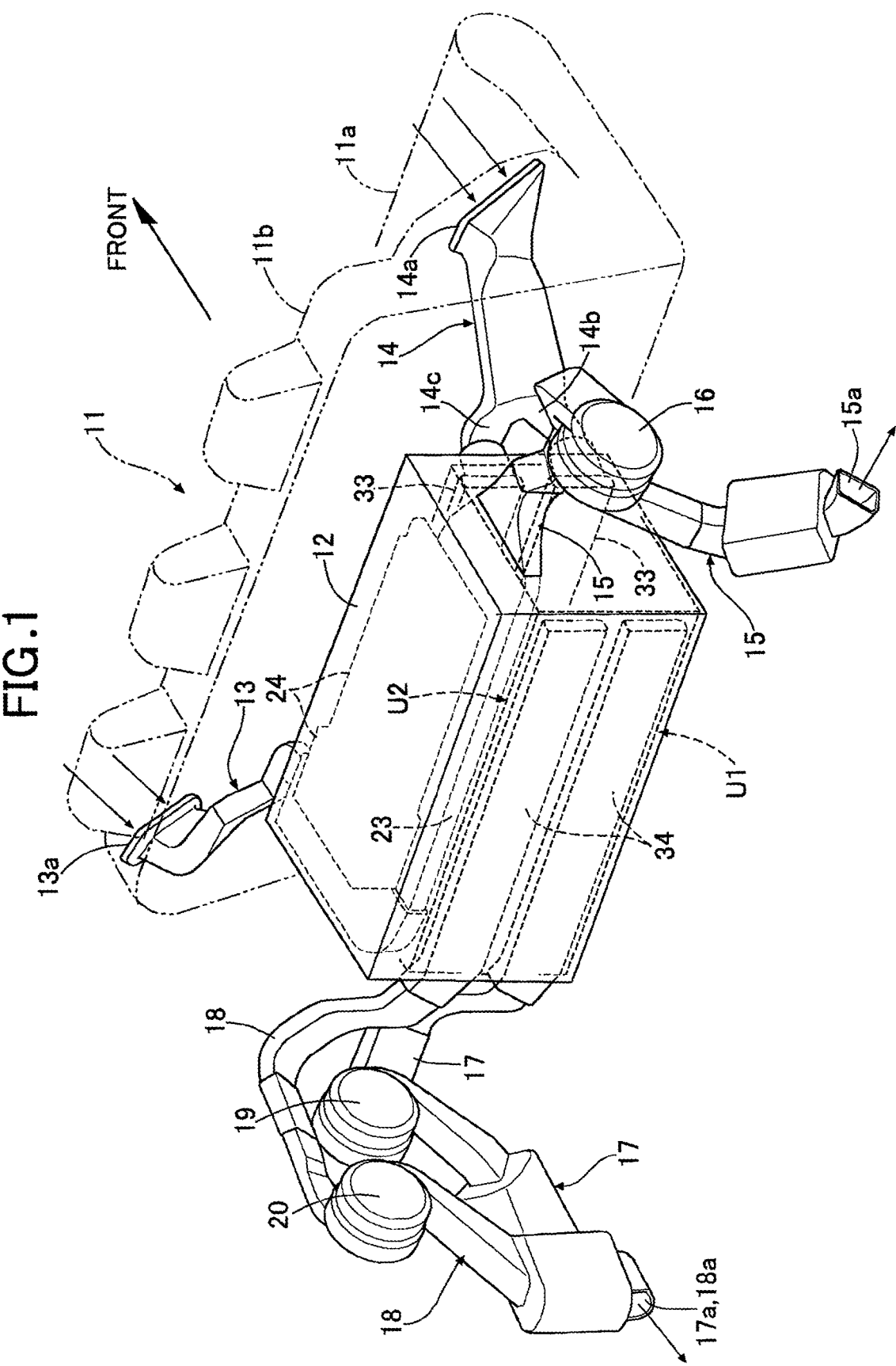
FIG. 1 is a perspective view of a battery unit. (first embodiment)
Figure 2:
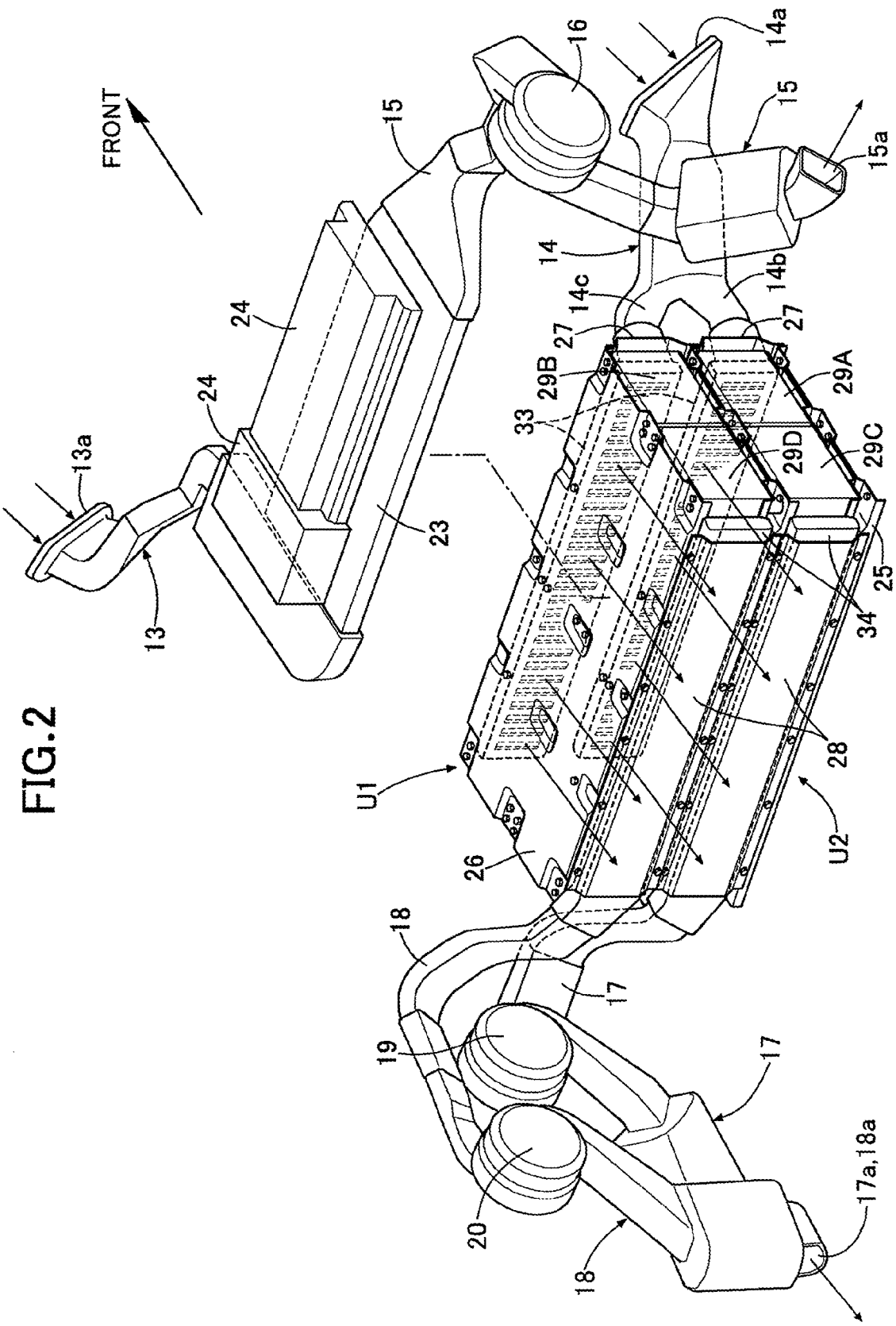
FIG. 2 is a perspective view of a state in which a casing is removed from the battery. unit (first embodiment)

As shown in FIG. 1 and FIG. 2, a battery unit for supplying electrical power to a motor/generator of a hybrid vehicle is installed in a luggage compartment to the rear of a rear seat 11 formed from a seat cushion 11a and a seat back 11b, and its main part is housed in a rectangular parallelepiped-shaped casing 12. A first intake duct 13 extending forward from the left-hand side of a front face of the casing 12 includes a first intake opening 13a opening on a left-hand side face of the seat back 11b of the rear seat 11, and a second intake duct 14 extending forward from the right-hand side of the front face of the casing 12 includes a second intake opening 14a opening in a passenger compartment on a right-hand side face of the seat back 11b of the rear seat 11. The downstream side of the second intake duct 14 branches into a lower duct 14b and an upper duct 14c.

A first exhaust duct 15 extends rearward from the right-hand side face of the casing 12, a first cooling fan 16 is provided in an intermediate part of the first exhaust duct 15, and a first exhaust opening 15a is formed at the downstream end thereof. A second exhaust duct 17 and a third exhaust duct 18 extend rearward from the left-hand side face of the casing 12, a second cooling fan 19 and a third cooling fan 20 are provided in intermediate parts thereof respectively, and a common second exhaust opening 17a (18a) is formed at the downstream ends thereof.

As shown in FIG. 1 to FIG. 4, the battery unit includes first to fourth battery modules 22A to 22D having a plurality of stacked battery cells 21. Each of the battery modules 22A to 22D is formed from a total of 24 battery cells 21, the 24 battery cells 21 being divided into four groups of six each, and each of the battery modules 22A to 22D is therefore formed from a collection of four submodules.

The first and third battery modules 22A and 22C are placed in a lower part, and the second and fourth battery modules 22B and 22D are superimposed on top thereof. More specifically, the second battery module 22B is superimposed on top of the first battery module 22A, and the fourth battery module 22D is superimposed on top of the third battery module 22C. In this arrangement, the first and third battery modules 22A and 22C in the lower layer form a lower unit U1, and the second and fourth battery modules 22B and 22D in the upper layer form an upper unit U2.

A hollow plate-shaped cooling duct 23 with left and right opposite end parts thereof open is supported on top of the upper unit U2. The left end of the cooling duct 23 is connected to the downstream end of the first intake duct 13, and the right end of the cooling duct 23 is connected to the upstream end of the first exhaust duct 15. Heat-generating electrical equipment 24 such as a DC-DC converter, an ECU, or a charger for the first to fourth battery modules 22A to 22D is installed on an upper face of the cooling duct 23.

Structures of the lower unit U1 formed from the first and third battery modules 22A and 22C and the upper unit U2 formed from the second and fourth battery modules 22B and 22D are now explained. Since the lower unit U1 and the upper unit U2 have substantially the same structure, it is mainly the structure of the lower unit U1 that is explained as being representative thereof.

The lower unit U1 includes substantially flat plate-shaped lower and upper plates 25 and 26, a front duct cover 27 and rear duct cover 28 with a channel-shaped section, first and third end plates 29A and 29C, a first center plate 30A, and first and third quarter plates 31A and 31C. The lower plate 25, the upper plate 26, the front duct cover 27, and the rear duct cover 28 are formed by press forming a steel sheet, but the first and third end plates 29A and 29C, the first center plate 30A, and the first and third quarter plates 31A and 31C are made by aluminum die casting and have a predetermined thickness.

An inlet duct 33 extending in the left-and-right direction is disposed on a front face of the first battery module 22A positioned on the front side, a front face of the inlet duct 33 is covered with the front duct cover 27, and the downstream end of the lower duct 14b of the second intake duct 14 is connected to the right end of the inlet duct 33. An outlet duct 34 extending in the left-and-right direction is disposed on a rear face of the third battery module 22C positioned on the rear side, the rear face of the outlet duct 34 is covered with the rear duct cover 28, and the upstream end of the second exhaust duct 17 is connected to the left end of the outlet duct 34.

Figure 3:
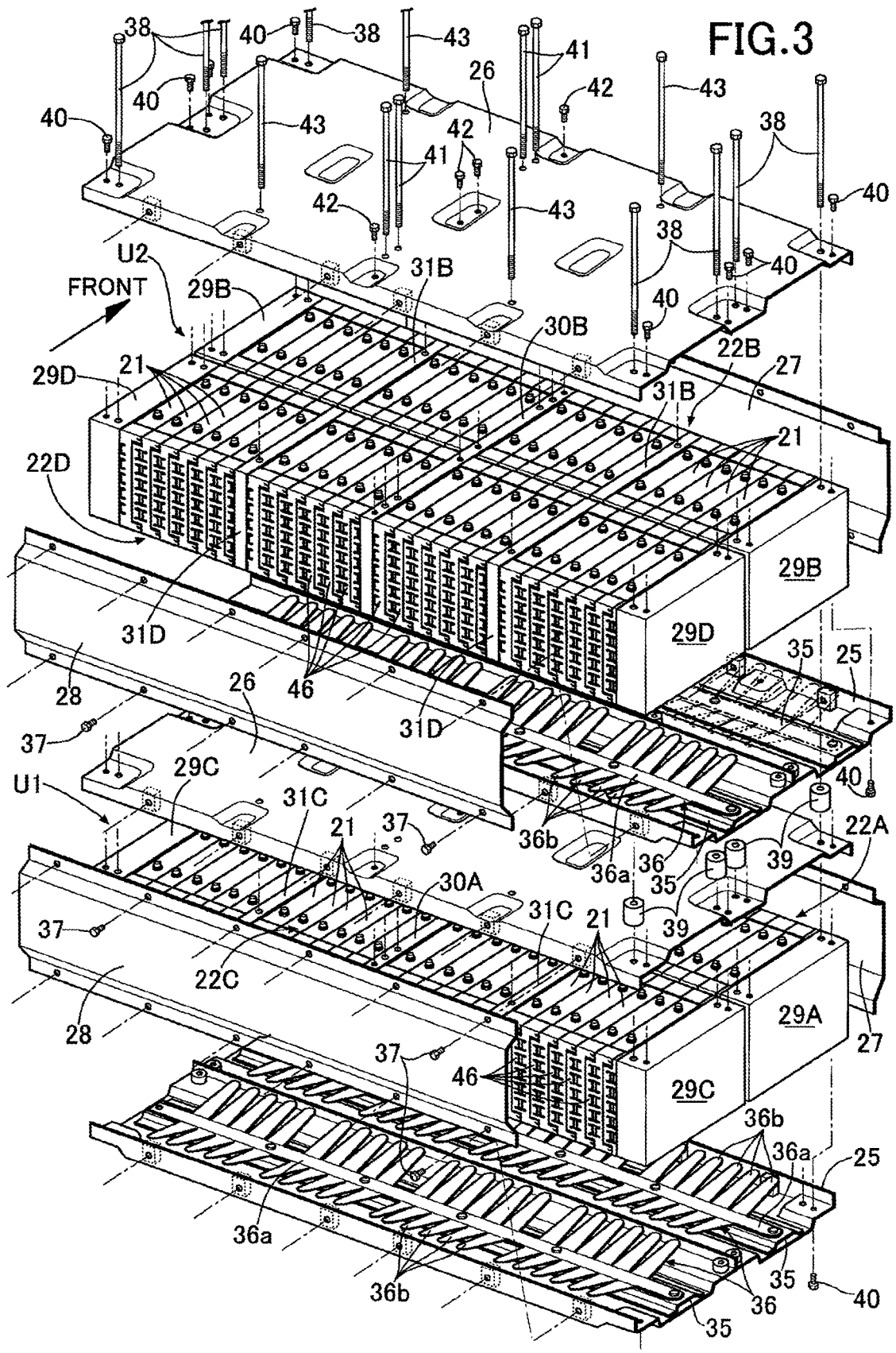
FIG. 3 is an exploded perspective view of a lower unit and an upper unit. (first embodiment)
Figure 8:
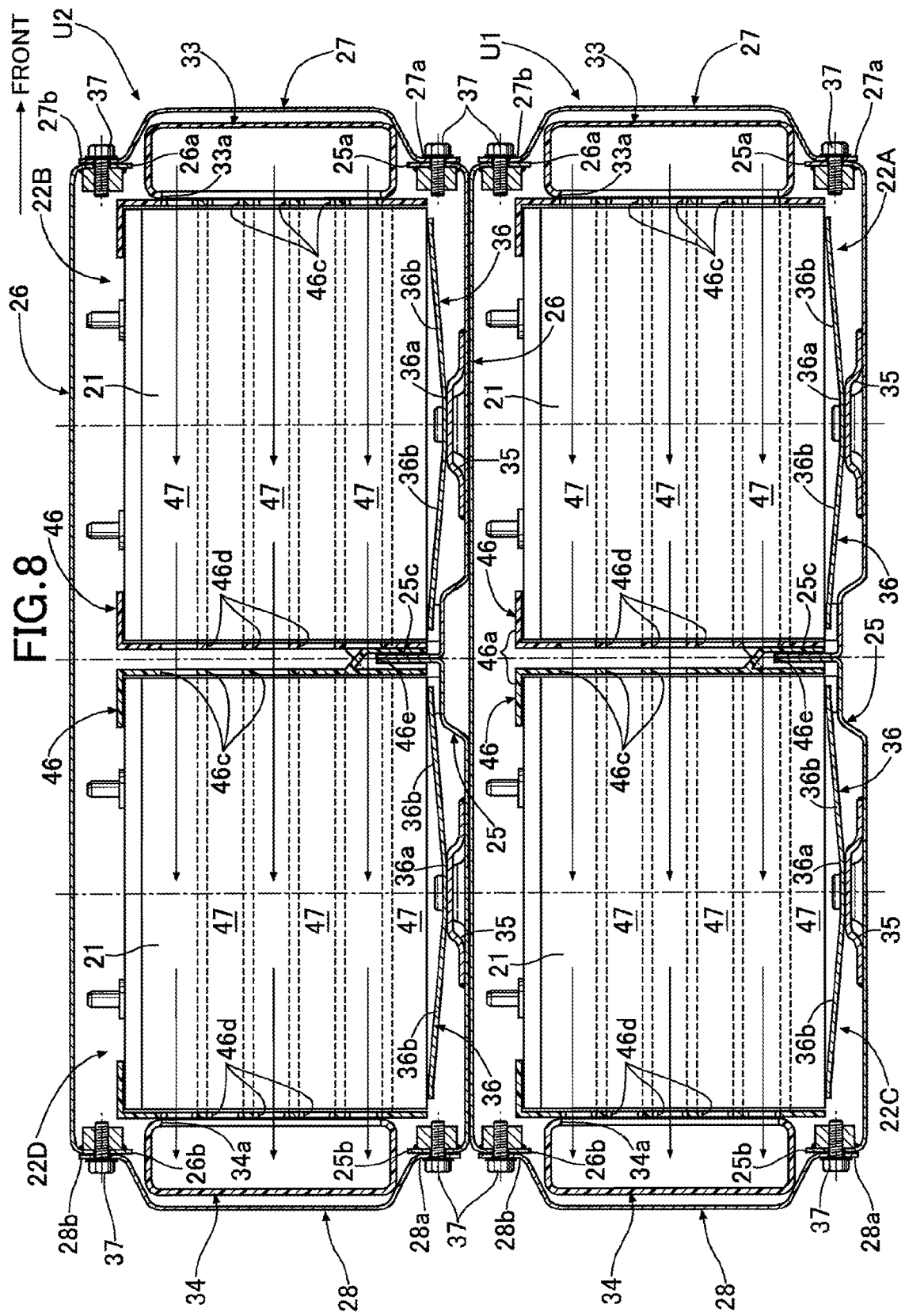
FIG. 8 is a sectional view along line 8-8 in FIG. 4. (first embodiment)

As is clearly shown in FIG. 3 and FIG. 8, the lower plate 25 includes a front flange 25a and rear flange 25b having their front and rear edges bent upward, and a positioning flange 25c projecting upward from the middle in the fore-and-aft direction and extending in the left-and-right direction. A plate spring support member 35 extending linearly in the left-and-right direction is fixed between the front flange 25a and the positioning flange 25c of the lower plate 25. A plate spring 36 formed from one metal plate includes a linear-shaped mounting portion 36a fixed to an upper face of the plate spring support member 35 and arm portions 36b protruding from the mounting portion 36a in the fore-and-aft direction in a comb shape with 24 teeth each, two arm portions 36b and 36b resiliently abutting against a lower face of each of the 24 battery cells 21 placed on top of the plate spring 36. The same plate spring support member 35 and plate spring 36 as described above are provided between the rear flange 25b and the positioning flange 25c of the lower plate 25.

A lower flange 27a formed by bending the lower edge of the front duct cover 27 rearward is fixed to the front flange 25a of the lower plate 25 by means of bolts 37, and a lower flange 28a formed by bending the lower edge of the rear duct cover 28 forward is fixed to the rear flange 25b of the lower plate 25 by means of bolts 37. Furthermore, an upper flange 27b formed by bending the upper edge of the front duct cover 27 rearward is fixed by means of bolts 37 to a front flange 26a formed by bending the front edge of the upper plate 26 downward, and an upper part flange 28b formed by bending the upper edge of the rear duct cover 28 forward is fixed by means of bolts 37 to a rear flange 26b formed by bending the rear edge of the upper plate 26 downward.

This allows lower faces, upper faces, front faces, and rear faces of the first and third battery modules 22A and 22C to be covered by the lower plate 25, the upper plate 26, the front duct cover 27, and the rear duct cover 28, which form a box-shaped tube. Left and right openings of the box-shaped tube are blocked by a total of four first and third end plates 29A and 29A; 29C and 29C disposed at opposite ends on the left and right of the first and third battery modules 22A and 22C.

The structure of the upper unit U2 having the second and fourth battery modules 22B and 22D is substantially the same as the above structure of the lower unit U1 having the first and third battery modules 22A and 22C.

A structure for joining the lower unit U1 and the upper unit U2, which are arranged as above, is now explained.

Figure 4:
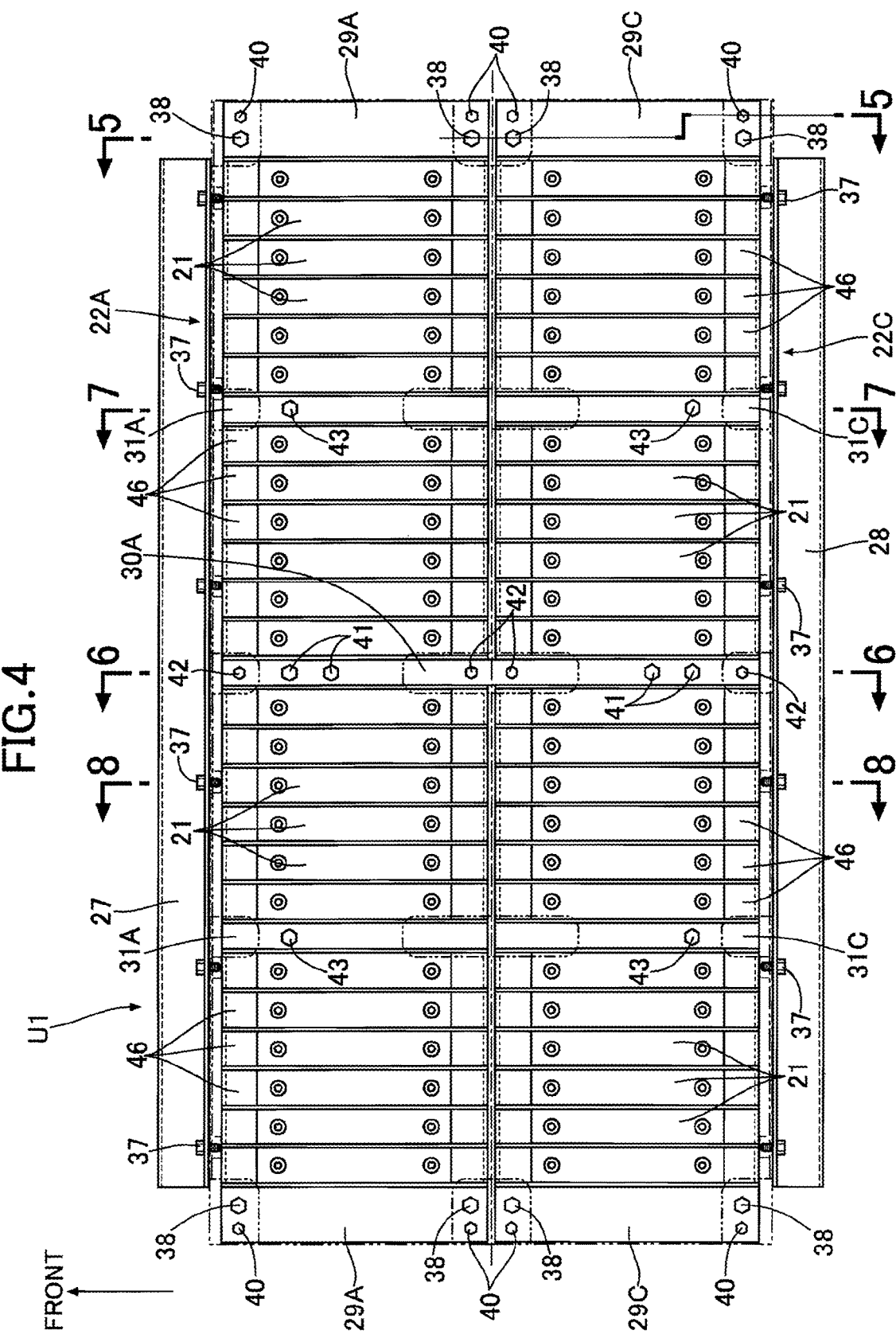
FIG. 4 is a plan view of first and third battery modules (second and fourth battery modules). (first embodiment)
Figure 5:
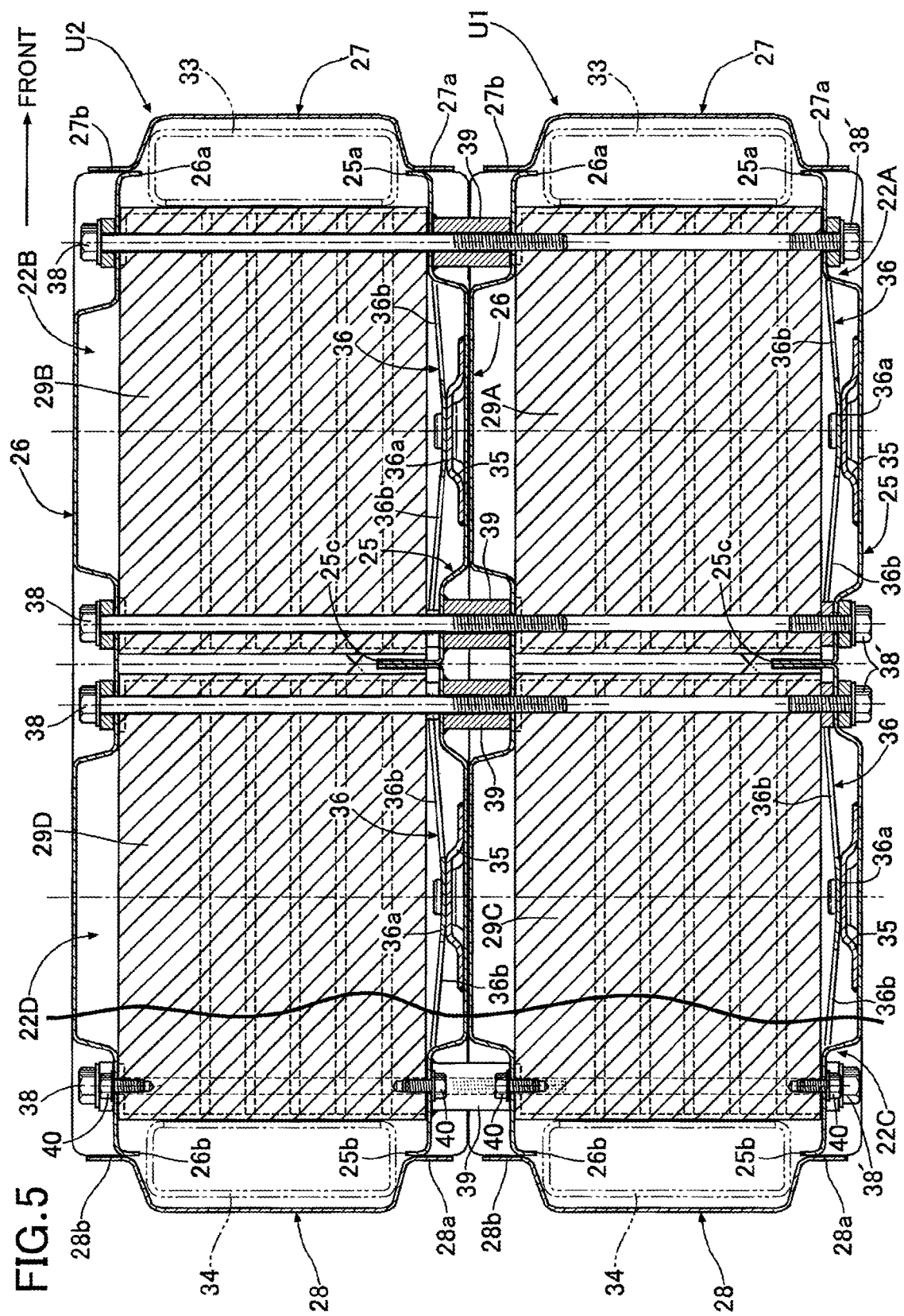
FIG. 5 is a sectional view along line 5-5 in FIG. 4. (first embodiment)

As shown in FIG. 3 to FIG. 5, on one side in the left-and-right direction of the battery unit, four long bolts 38 extend through the upper plate 26, second and fourth end plates 29B and 29D, and lower plate 25 of the upper unit U2, spacer collars 39, and the upper plate 26 of the lower unit U1, and are screwed into the first and third end plates 29A and 29C of the lower unit U1, and four short bolts 38' disposed coaxially with the four long bolts 38 extend through the lower plate 25 of the lower unit U1 and are screwed into the first and third end plates 29A and 29C of the lower unit U1, thereby integrally joining the lower unit U1 and the upper unit U2.

Furthermore, the upper plates 26 and 26 and lower plates 25 and 25 of the lower unit U1 and upper unit U2 are joined to the first to fourth end plates 29A and 29A; 29B and 29B; 29C and 29C; 29D and 29D by means of a total of 16 bolts 40.

In this state, since the weight of the second and fourth battery modules 22B and 22D of the upper unit U2 is transmitted to the floor of the vehicle body via the second and fourth end plates 29B and 29D of the upper unit U2, the spacer collars 39, and the first and third end plates 29A and 29C of the lower unit U1, the weight of the second and fourth battery modules 22B and 22D of the upper unit U2 is not applied directly to the battery cells 21 of the first and third battery modules 22A and 22C of the lower unit U1. The structure on the other side in the left-and-right direction of the battery unit is the same as the structure on said one side in the left-and-right direction of the battery unit described above.

Figure 6:
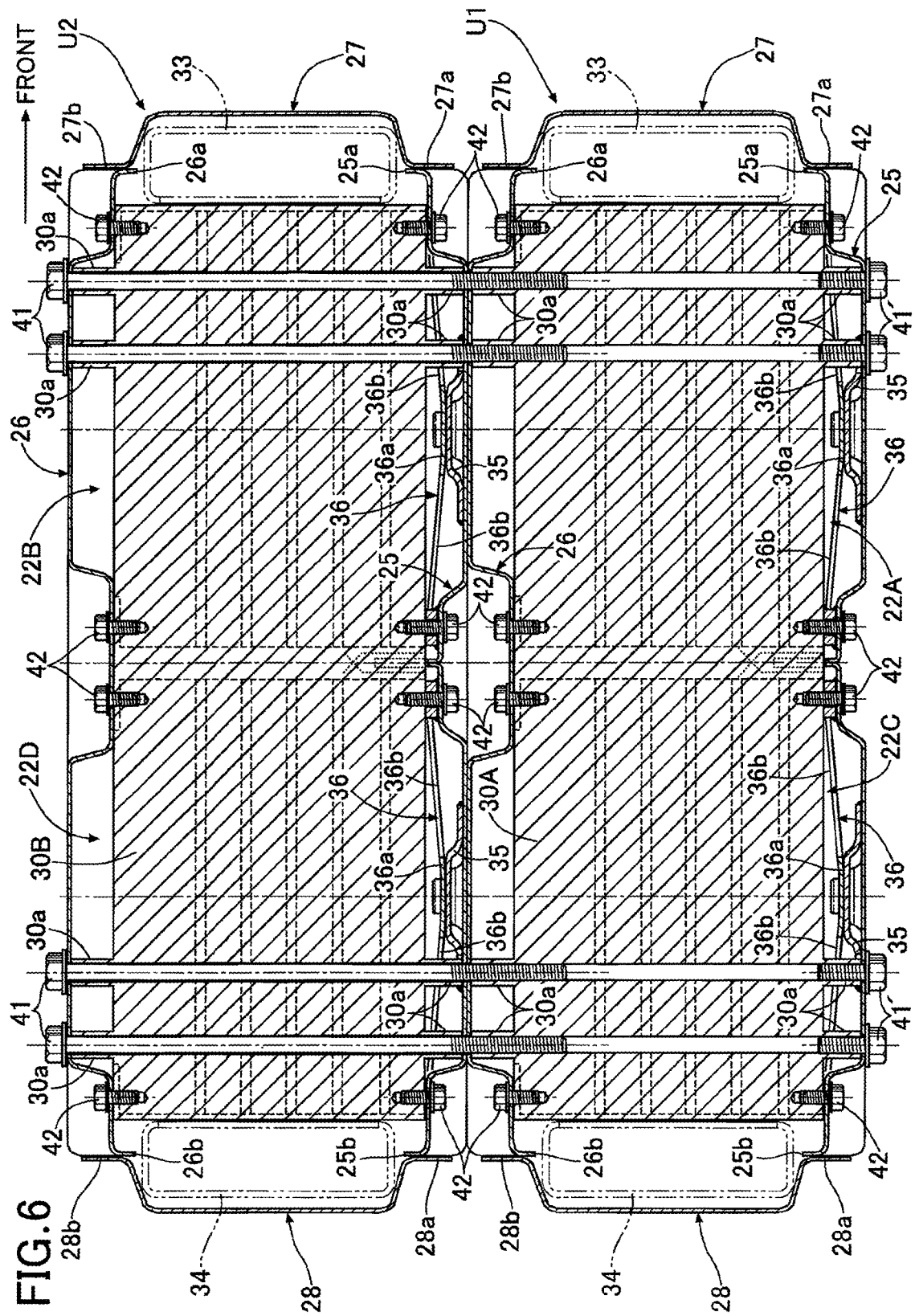
FIG. 6 is a sectional view along line 6-6 in FIG. 4. (first embodiment)

As shown in FIG. 3, FIG. 4, and FIG. 6, in the middle in the left-and-right direction of the battery unit, four long bolts 41 extend through the upper plate 26, second center plate 30B, and lower plate 25 of the upper unit U2 and the upper plate 26 of the lower unit U1 and are screwed into the first center plate 30A of the lower unit U1, and four short bolts 41' disposed coaxially with the four long bolts 41 extend through the lower plate 25 of the lower unit U1 and are screwed into the first center plate 30A of the lower unit U1, thereby integrally joining the lower unit U1 and the upper unit U2.

Moreover, the upper plates 26 and 26 and the lower plates 25 and 25 of the lower unit U1 and the upper unit U2 are joined to the first and second center plates 30A and 30B by means of a total of 16 bolts 42.

In this state, since the weight of the second and fourth battery modules 22B and 22D of the upper unit U2 is transmitted to the floor of the vehicle body via the second center plate 30B of the upper unit U2 and the first center plate 30A of the lower unit U1, the weight of the second and fourth battery modules 22B and 22D of the upper unit U2 is not applied directly to the battery cells 21 of the first and third battery modules 22A and 22C of the lower unit U1. In this arrangement, projections 30a for the bolts 41, 41' to extend through are projectingly provided at the upper edge and the lower edge of the first and second center plates 30A and 30B so that the weight of the upper unit U2 is reliably transmitted to the lower unit U1.

Figure 7:
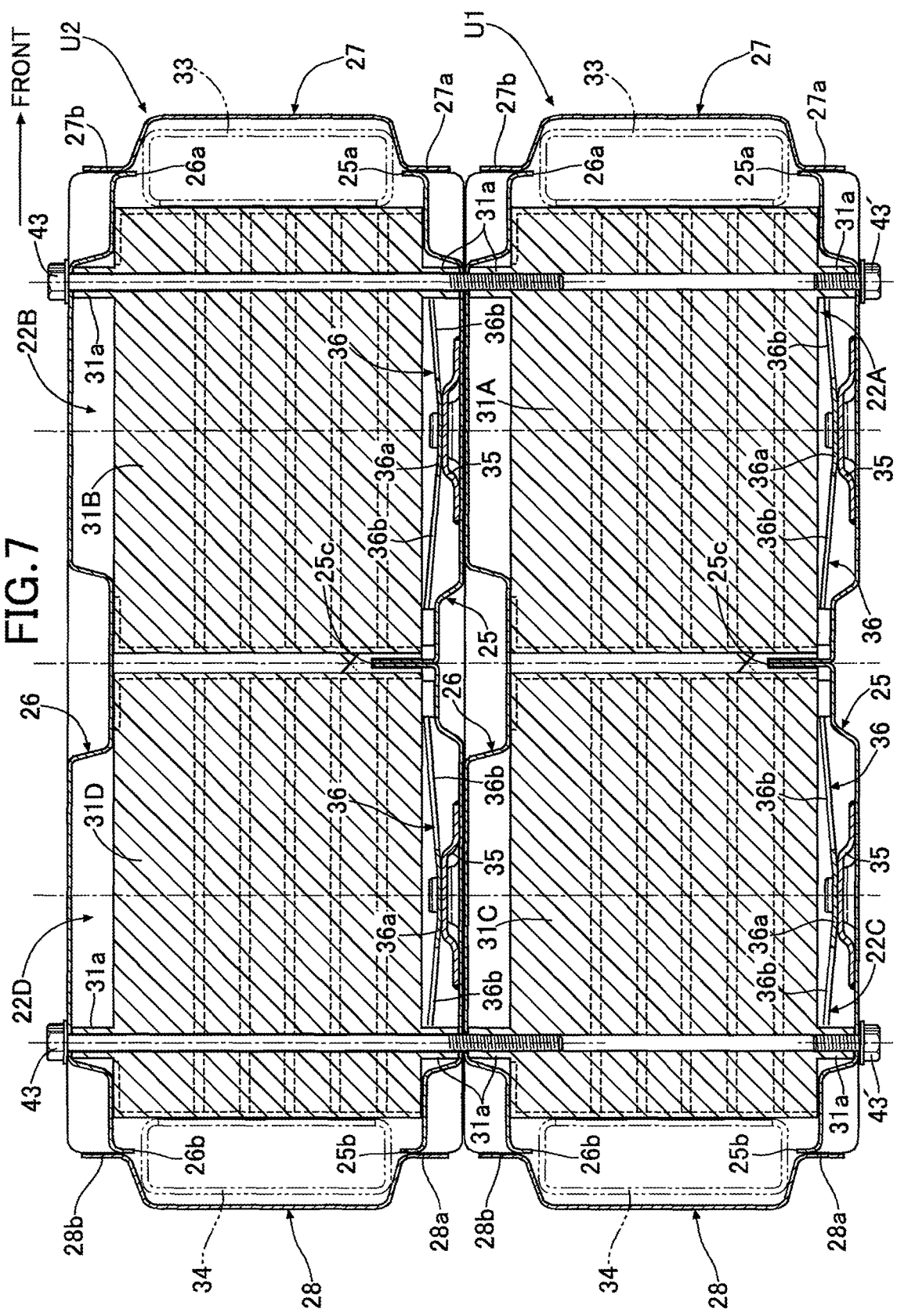
FIG. 7 is a sectional view along line 7-7 in FIG. 4. (first embodiment)

As shown in FIG. 3, FIG. 5, and FIG. 7, on one side in the left-and-right direction relative to the first and second center plates 30A and 30B, two long bolts 43 and 43 extend through the upper plate 26, second and fourth quarter plates 31B and 31D, and lower plate 25 of the upper unit U2 and the upper plate 26 of the lower unit U1 and are screwed into the first and third quarter plates 31A and 31C of the lower unit U1, and two short bolts 43' and 43' disposed coaxially with the two long bolts 43 and 43 extend through the lower plate 25 of the lower unit U1 and are screwed into the first and third quarter plates 31A and 31C of the lower unit U1, thereby integrally joining the lower unit U1 and the upper unit U2.

In this state, since the weight of the second and fourth battery modules 22B and 22D of the upper unit U2 is transmitted to the floor of the vehicle body via the second and fourth quarter plates 31B and 31D of the upper unit U2 and the first and third quarter plates 31A and 31C of the lower unit U1, the weight of the second and fourth battery modules 22B and 22D of the upper unit U2 is not applied directly to the first and third battery modules 22A and 22C of the lower unit U1.

In this arrangement, projections 31a for the bolts 43, 43' to extend through are projectingly provided at the upper edge and the lower edge of the first to fourth quarter plates 31A to 31D so that the weight of the upper unit U2 is reliably transmitted to the lower unit U1. The structure on the other side in the left-and-right direction relative to the first and second center plates 30A and 30B is the same as the structure on said one side in the left-and-right direction relative to the first and second center plates 30A and 30B described above.

Figure 9:
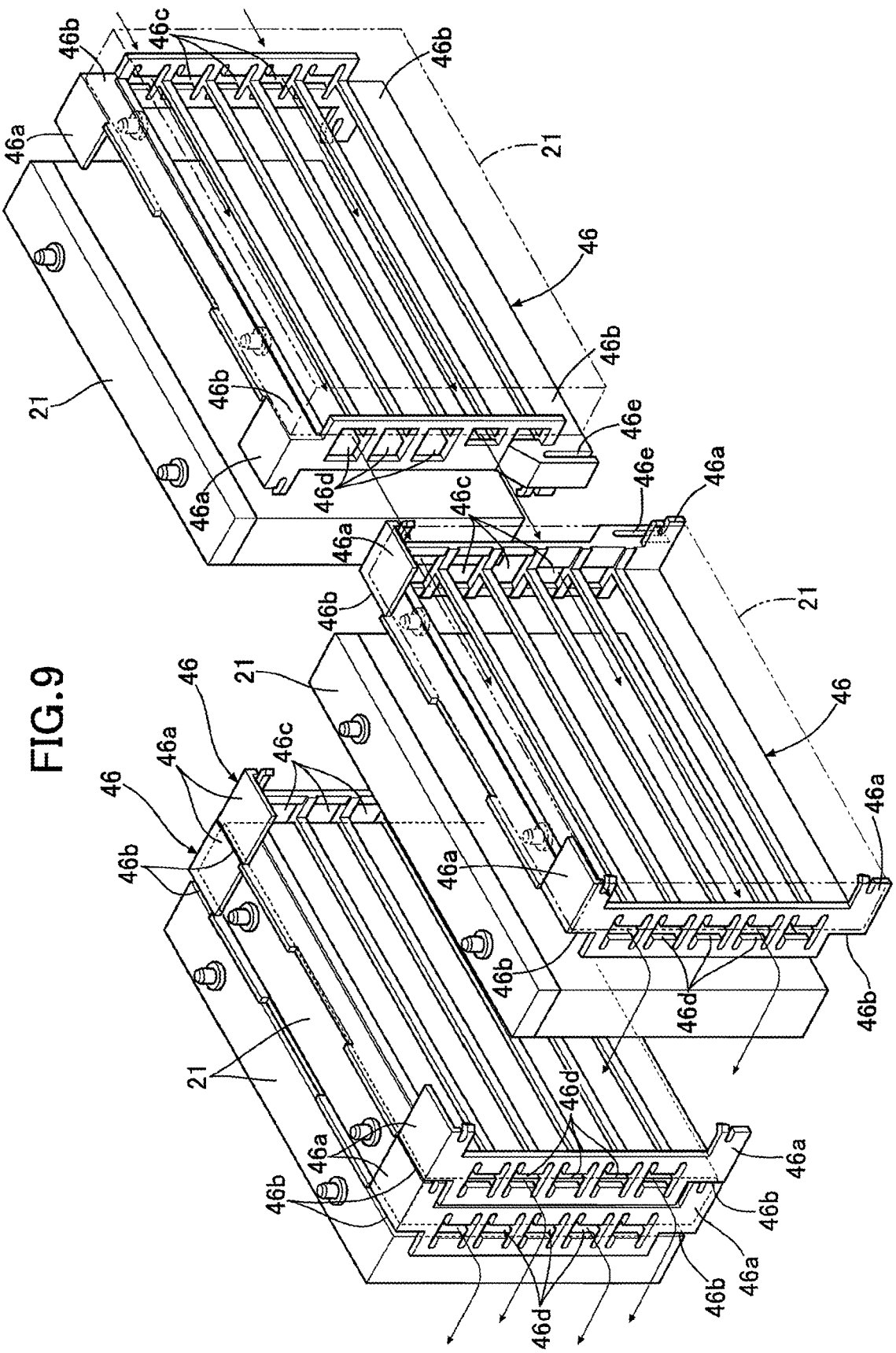
FIG. 9 is an exploded perspective view of a battery cell and a holder. (first embodiment)

As shown in FIG. 8 and FIG. 9, a holder 46 made of a synthetic resin is fitted around each of the battery cells 21 forming the first to fourth battery modules 22A to 22D so as to mate with one side face thereof. The holder 46 has convex portions 46a and concave portions 46b, and adjacent battery cells 21 and 21 are positioned relative to each other by the holders 46 and 46 of the adjacent battery cells 21 and 21 being mated with each other via the convex portions 46a and the concave portions 46b.

When the adjacent battery cells 21 and 21 are positioned relative to each other with the holder 46 interposed therebetween, air passages 47 for cooling air to pass through are formed between the battery cells 21 and 21, and openings 46c and 46d of the holder 46 are formed at opposite ends of the air passages 47. The opening 46c at the front side of the holder 46 of the first battery module 22A communicates with the interior of the inlet duct 33 via an opening 33a of the inlet duct 33, the opening 46d at the rear side of the holder 46 of the first battery module 22A communicates with the opening 46c at the front side of the holder 46 of the third battery module 22C, and the opening 46d at the rear side of the holder 46 of the third battery module 22C communicates with the interior of the outlet duct 34 via an opening 34a of the outlet duct 34.

Furthermore, an engagement groove 46e is formed on an end face, on the third battery module 22C side, of the holder 46 of the first battery module 22A, the engagement groove 46e opening downwardly and being capable of engaging with the positioning flange 25c of the lower plate 25, and an engagement groove 46e is formed on an end face, on the first battery module 22A side, of the holder 46 of the third battery module 22C, the engagement groove 46e opening downwardly and being capable of engaging with the positioning flange 25c of the lower plate 25.

Figure 10:
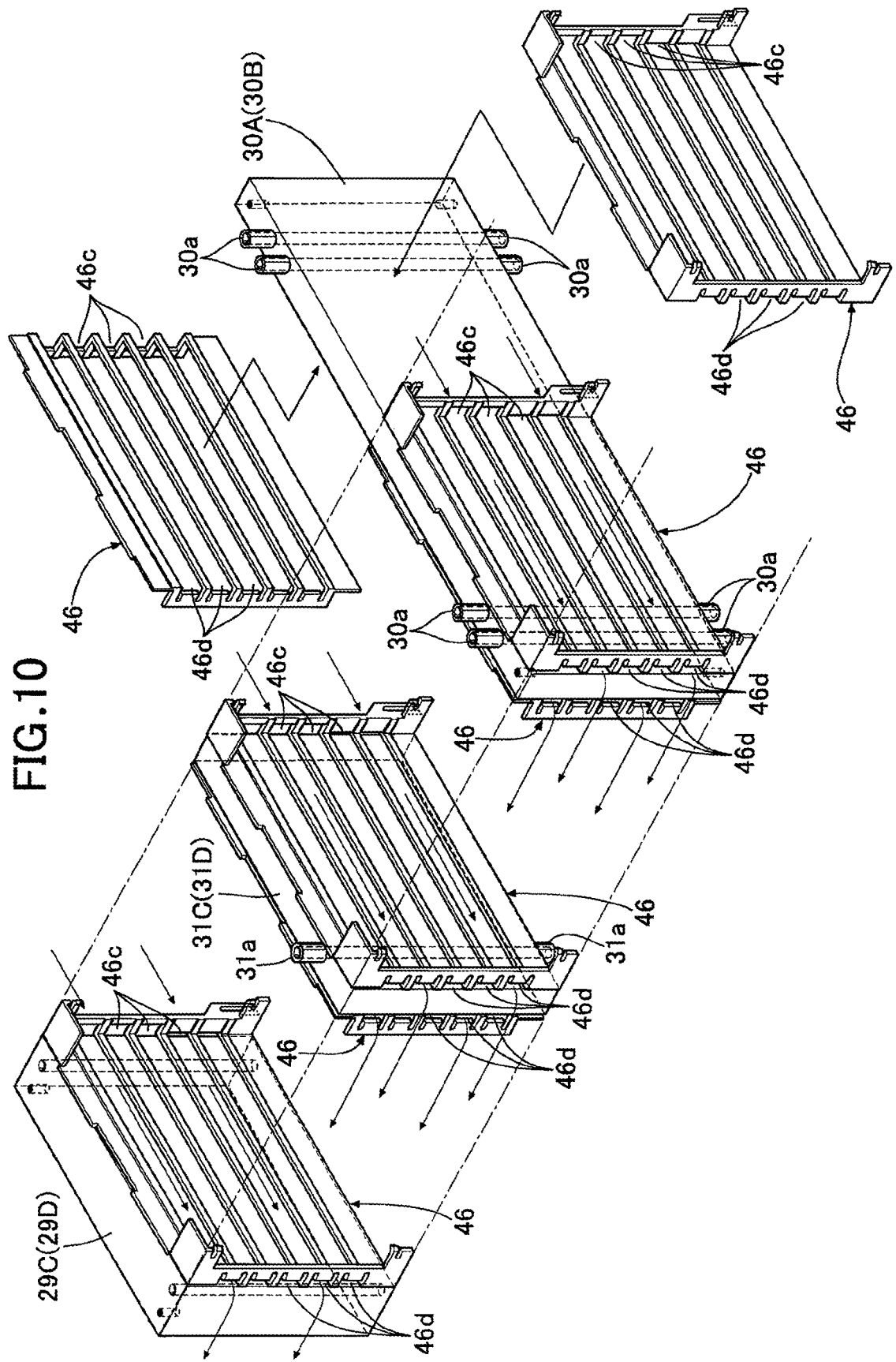
FIG. 10 is a perspective view of a holder having a different shape. (first embodiment)

As shown in FIG. 10, the shape of holders 46 opposing the first to fourth end plates 29A to 29D, the first and second center plates 30A and 30B, and the first to fourth quarter plates 31A to 31D is slightly different from the shape of the other normal holder 46 interposed between two battery cells 21 and 21 explained by reference to FIG. 9, but the function thereof is substantially the same.

The operation of the embodiment of the present invention having the above-mentioned arrangement is now explained.

The first to fourth battery modules 22A to 22D of the battery unit and the electrical equipment 24 generate heat accompanying travel of the hybrid vehicle; air that is drawn in via the first intake opening 13a, which opens within the passenger compartment, due to the operation of the first cooling fan 16 flows into the cooling duct 23 via the first intake duct 13, carries out heat exchange with the electrical equipment 24 while passing therethrough to thus cool the electrical equipment 24, and is then discharged from the first exhaust opening 15a via the first exhaust duct 15 having the first cooling fan 16 disposed therein.

Furthermore, air that is drawn in via the second intake opening 14a, which opens within the passenger compartment, due to the operation of the second cooling fan 19 flows into the inlet duct 33 on the lower side via the lower duct 14b of the second intake duct 14 and issues toward the rear from the openings 33a. Air that has issued from each opening 33a flows into the outlet duct 34 via the path: opening 46c at front side of holder 46 of first battery module 22A→air passage 47 within holder 46→opening 46d at rear side of above holder 46→opening 46d at front side of holder 46 of third battery module 22C→air passage 47 within holder 46→opening 46d at rear side of above holder 46→opening 34a of outlet duct 34 on lower side, and air that has merged therein is discharged from the second exhaust opening 17a via the second exhaust duct 17 having the second cooling fan 19 disposed therein.

Similarly, air that is drawn in via the second intake opening 14a, opening within the passenger compartment, due to the operation of the third cooling fan 20 flows into the inlet duct 33 on the upper side via the upper duct 14c of the second intake duct 14 and issues toward the rear from the openings 33a. Air that has issued from each opening 33a flows into the outlet duct 34 via the path: opening 46d at front side of holder 46 of second battery module 22B→air passage 47 within holder 46→opening 46d at rear side of above holder 46→opening 46d at front side of holder 46 of fourth battery module 22D→air passage 47 within holder 46→opening 46d at rear side of above holder 46→opening 34a of outlet duct 34 on upper side, and air that has merged therein is discharged from the second exhaust opening 18a via the third exhaust duct 18 having the third cooling fan 20 disposed therein.

As a result, air flowing within the air passages 47 within the holders 46 carries out heat exchange with the battery cells 21, thus cooling the first to fourth battery modules 22A to 22D. During this process, since the first cooling fan 16 for cooling the electrical equipment 24 and the second and third cooling fans 19 and 20 for cooling the first to fourth battery modules 22A to 22D are disposed on left and right parts of the battery unit in a divided manner, not only is it possible to make the layout of the first to third cooling fans 16, 19, and 20 compact, but it is also possible to reduce the dimensions of each of the first and second intake openings 13a and 14a since the first intake opening 13a for supplying air to the first cooling fan 16 and the second intake opening 14a for supplying air to the second and third cooling fans 19 and 20 are separately provided.

If battery cells 21 were in direct contact with the first to fourth end plates 29A to 29D, the first and second center plates 30A and 30B, and the first to fourth quarter plates 31A to 31D, which are made of metal, only these battery cells 21 would be excessively cooled, and there would be a possibility of impairing the durability, but since the holders 46, which are made of a synthetic resin and function as heat insulating members, are disposed between the first to fourth end plates 29A to 29D, first and second center plates 30A and 30B, and first to fourth quarter plates 31A to 31D and the battery cells 21 opposite thereto, it is possible to prevent the above specified battery cells 21 from being excessively cooled.

When the upper unit U2 is superimposed on top of the lower unit U1, there is a possibility of the battery cells 21 of the lower unit U1 being damaged due to the weight of the upper unit U2, but in the present embodiment this problem is solved as follows.

That is, in a state in which the upper unit U2 is superimposed on top of the lower unit U1, the second and fourth end plates 29B and 29D, the second center plate 30B, and the second and fourth quarter plates 31B and 31D of the second and fourth battery modules 22B and 22D of the upper unit U2 are placed respectively on the first and third end plates 29A and 29C, the first center plate 30A, and the first and third quarter plates 31A and 31C of the first and third battery modules 22A and 22C of the lower unit U1 and, therefore, the weight of the upper unit U2 is not imposed on the battery cells 21 of the lower unit U1 and is prevented from affecting the battery cells 21 of the lower unit U1.

The first to fourth battery modules 22A to 22D are formed by stacking a plurality of battery cells 21, and since there is a small tolerance for the thickness of the battery cells 21, a difference in length in the stacking direction of the first to fourth battery modules 22A to 22D cannot be avoided.

FIG. 11 is a schematic drawing when the first and third battery modules 22A and 22C of the lower unit U1 are viewed from above; the first center plate 30A is one member, the first and third quarter plates 31A and 31C are two separate members, and the first and third end plates 29A and 29C are also two separate members. Therefore, even if there is a small tolerance for the thickness of the battery cells 21, due to the positions of the first and third quarter plates 31A and 31C and the positions of the first and third end plates 29A and 29C being displaced in the stacking direction of the battery cells 21, the tolerance can be taken up, thus preventing a gap from being formed between the adjacent battery cells 21. This operational effect is also exhibited for the upper unit U2 in the same manner.

In this arrangement, since if the positions of the second and fourth quarter plates 31B and 31D of the upper unit U2 were completely displaced relative to the first and third quarter plates 31A and 31C of the lower unit U1, and the positions of the second and fourth end plates 29B and 29D of the upper unit U2 were completely displaced relative to the first and third end plates 29A and 29C of the lower unit U1, the weight of the upper unit U2 would be transmitted to the battery cells 21 of the lower unit U1, the thicknesses of the first to fourth quarter plates 31A to 31D and the thicknesses of the first to fourth end plates 29A to 29D are set to be sufficiently large so that at least parts thereof are superimposed.

In addition, in order to allow the above displacement, in the stacking direction of the battery cells 21, between the first to fourth quarter plates 31A to 31D and between the first to fourth end plates 29A to 29D, which are secured by the bolts 43, 43; 38, 38', it is necessary to form the bolt holes of the lower plates 25 and 25 and the upper plates 26 and 26 and bolt holes of the second and fourth quarter plates 31B and 31D and the second and fourth end plates 29B and 29D of the upper unit U2, through which the bolts 43, 43; 38, 38' extend, as long holes that are long in the stacking direction.

Furthermore, when the vehicle undergoes sudden braking or sudden starting, an inertial force in the fore-and-aft direction of the vehicle body is imposed on the battery cells 21, but since the engagement groove 46e provided on the holder 46 retaining each battery cell 21 engages with the positioning flange 25c of the lower plate 25, it is possible to position the battery cell 21 in the fore-and-aft direction and prevent displacement in the fore-and-aft direction due to the inertial force. In this process, since the engagement groove 46e of the holder 46 can move in the stacking direction along the positioning flange 25c, the displacement in the stacking direction due to the tolerance in the thickness of the battery cell 21 described above is allowed for without problems.

Furthermore, the first to fourth end plates 29A to 29D are existing members in the battery unit and, moreover, since the first and second center plates 30A and 30B and the first to fourth quarter plates 31A to 31D are disposed in the interior of the battery unit and do not project outside, it is possible to minimize any increase in the dimensions of the battery unit due to the first and second center plates 30A and 30B and the first to fourth quarter plates 31A to 31D being provided, and to prevent interference with the layout of the inlet ducts 33 and 33, the outlet ducts 34 and 34, etc.

An embodiment of the present invention is explained above, but the present invention may be modified in a variety of ways as long as the modifications do not depart from the spirit and scope thereof.

For example, in the embodiment, the lower unit U1 includes the first and third battery modules 22A and 22C, and the upper unit U2 includes the second and fourth battery modules 22B and 22D, but the number of battery modules of each of the lower unit U1 and the upper unit U2 may be one or may be three or more.

Furthermore, the first to fourth battery modules 22A to 22D of the embodiment include the first to fourth quarter plates 31A to 31D, but the first to fourth quarter plates 31A to 31D may be omitted.

Moreover, in the embodiment the spacer collars 39, which are separate members, are disposed between the first and third end plates 29A and 29C and the second and fourth end plates 29B and 29D, but these spacer collars 39 may be formed integrally with the first and third end plates 29A and 29C and/or the second and fourth end plates 29B and 29D. That is, the weight of the upper unit U2 should reliably be transmitted from the second and fourth end plates 29B and 29D on the upper side to the first and third end plates 29A and 29C on the lower side.

The invention claimed is:

1. A vehicle battery unit, comprising:
first and second battery modules having a plurality of battery cells stacked in a horizontal direction, the second battery module being superimposed on top of the first battery module,
wherein the first battery module comprises first holders disposed between adjacent ones of the plurality of battery cells of the first battery module, respectively, a first support plate disposed in an intermediate part in a stacking direction of the plurality of battery cells of the first battery module at a position in direct contact with adjacent ones of the first holders of the first battery module and having a thickness in the stacking direction larger than thicknesses of the first holders at their portions placed between the adjacent cells, and first end plates disposed in each of opposite end parts in the stacking direction of the plurality of battery cells of the first battery module,
wherein the second battery module comprises second holders disposed between adjacent ones of the plurality of battery cells of the second battery module, respectively, a second support plate disposed in an intermediate part in a stacking direction of the plurality of battery cells of the second battery module at a position in direct contact with adjacent ones of the second holders of the second battery module and having a thickness in the stacking direction larger than thicknesses of the second holders at their positions placed between the adjacent cells, and second end plates disposed in each of opposite end parts in the stacking direction of the plurality of battery cells of the second battery module,
wherein the second support plate is placed on top of the first support plate, the second end plates are placed on top of the first end plates, and the first and second support plates are joined together by a tightening member extending through one of the first and second support plates and being tightened to the other of the first and second support plates, and
wherein the vehicle battery unit further comprises a third battery module having a plurality of battery cells stacked in the horizontal direction, placed side by side with respect to the first battery module in a direction perpendicular to the stacking direction,
wherein the first support plate extends into the third battery module at an intermediate part in the stacking direction of the plurality of battery cells of the third battery module,
wherein third end plates are disposed in each of opposite end parts in the stacking direction of the plurality of battery cells of the third battery module, the third end plates being formed separately from the first end plates,
wherein the first support plate is fixed to a lower plate on which the first and third battery modules are placed,
wherein the first and second support plates are provided with projections which project towards each other, at mutually facing edge portions of the first and second support plates, and
wherein the tightening member extends through the projections.

2. The vehicle battery unit according to claim 1, wherein a heat insulating member is disposed between the first support plate and the battery cell adjacent thereto or between the first end plate and the battery cell adjacent thereto.

3. The vehicle battery unit according to claim 1, wherein a heat insulating member is disposed between the second support plate and the battery cell adjacent thereto or between the second end plate and the battery cell adjacent thereto.

4. The vehicle battery unit according to claim 1, wherein a positioning flange extending along the stacking direction between the first and third battery modules is formed on the lower plate, third holders are disposed between the plurality of battery cells of the third battery module, the third holders positioning the plurality of battery cells of the third battery module relative to each other, and an engagement portion engaging with the positioning flange is formed on the third holders.

5. A vehicle battery unit, comprising:
first and second battery modules having a plurality of battery cells stacked in a horizontal direction, the second battery module being superimposed on top of the first battery module,
wherein the first battery module comprises first holders disposed between adjacent ones of the plurality of battery cells of the first battery module, respectively, a first support plate disposed in an intermediate part in a stacking direction of the plurality of battery cells of the first battery module and having a thickness in the stacking direction larger than thicknesses of the first holders at their portions placed between the adjacent cells, and first end plates disposed in each of opposite end parts in the stacking direction of the plurality of battery cells of the first battery module, the first battery module not including additional end plates between the first end plates,
wherein the second battery module comprises second holders disposed between adjacent ones of the plurality of battery cells of the second battery module, respectively, a second support plate disposed in an intermediate part in a stacking direction of the plurality of battery cells of the second battery module and having a thickness in the stacking direction larger than thicknesses of the second holders at their positions placed between the adjacent cells, and second end plates disposed in each of opposite end parts in the stacking direction of the plurality of battery cells of the second battery module, the second battery module not including additional end plates between the second end plates,
wherein the second support plate is placed on top of the first support plate, the second end plates are placed on top of the first end plates, and the first and second support plates are joined together by a tightening member extending through one of the first and second support plates and being tightened to the other of the first and second support plates, and
wherein the vehicle battery unit further comprises a third battery module having a plurality of battery cells stacked in the horizontal direction, placed side by side with respect to the first battery module in a direction perpendicular to the stacking direction,
wherein the first support plate extends into the third battery module at an intermediate part in the stacking direction of the plurality of battery cells of the third battery module,
wherein third end plates are disposed in each of opposite end parts in the stacking direction of the plurality of battery cells of the third battery module, the third end plates being formed separately from the first end plates, the third battery module not including additional end plates between the third end plates, wherein the first support plate is fixed to a lower plate on which the first and third battery modules are placed, wherein the first and second support plates are provided with projections which project towards each other, at mutually facing edge portions of the first and second support plates, and wherein the tightening member extends through the projections.

6. The vehicle battery unit according to claim 5, wherein a heat insulating member is disposed between the first support plate and the battery cell adjacent thereto or between the first end plate and the battery cell adjacent thereto.

7. The vehicle battery unit according to claim 5, wherein a heat insulating member is disposed between the second support plate and the battery cell adjacent thereto or between the second end plate and the battery cell adjacent thereto.

8. The vehicle battery unit according to claim 5, wherein a positioning flange extending along the stacking direction between the first and third battery modules is formed on the lower plate, third holders are disposed between the plurality of battery cells of the third battery module, the third holders positioning the plurality of battery cells of the third battery module relative to each other, and an engagement portion engaging with the positioning flange is formed on the third holders.

\* \* \* \* \*